United States Patent Office 2,820,827
Patented Jan. 21, 1958

2,820,827

PROCESS OF SEPARATING L- AND D-AMINO-METHYL-(3,4-DIHYDROXYPHENYL)-CARBINOL

Heinrich Ruschig and Leonhard Stein, Bad Soden am Taunus, Germany, assignors to Farbwerke Hoechst Aktiengesellschaft vormals Meister Lucius & Brüning, Frankfurt am Main, Germany, a corporation of Germany No Drawing. Application October 26, 1954
Serial No. 464,877

Claims priority, application Germany November 2, 1953

10 Claims. (Cl. 260—570.6)

The present invention relates to a process of preparing l- and d-aminomethyl-(3.4-dihydroxyphenyl)-carbinol.

It is already known that d.l-aminomethyl-(3.4-dihydroxyphenyl)-carbinol the synthesis of which was first carried out by Stolz and Flaecher in 1905, can be separated into its optical antipodes by treating the racemate with optically active acids, for example tartaric acid, in the presence of a solvent containing at least 5% of water and separating the resulting diastereoisomers by fractional crystallization. The l-aminomethyl-(3.4-dihydroxyphenyl)-carbinol with d-tartaric acid forms a hydrate which is less soluble in water and more soluble in methyl or ethyl alcohol than is the corresponding anhydrous salt of d-aminomethyl-(3.4-dihydroxyphenyl)-carbinol. Owing to this fact it is possible to separate from an aqueous medium l-aminomethyl-(3.4-dihydroxyphenyl)-carbinol in the form of the bitartrate-mono-hydrate. This process has the disadvantage, however, that the preparation of the optical antipodes in a pure state requires repeated recrystallization of the crystalline fractions, whereby the yield is decreased.

Now, we have found, that the separation of d.l-aminomethyl-(3.4-dihydroxyphenyl)-carbinol into its optical antipodes may be carried out more rapidly and in a more simple manner by reacting d.l-aminomethyl-(3.4-dihydroxyphenyl)-carbinol with l- and/or d-mandelic acid or an ether of either in anhydrous aliphatic alcohols, separating the disastereoisomeric salts so obtained by fractional crystallization and isolating l-aminomethyl-(3.4-dihydroxyphenyl)-carbinol and/or d-aminomethyl-(3.4-dihydroxyphenyl)-carbinol from the corresponding amine salts, if desired, after the said salts have been recrystallized.

As anhydrous aliphatic alcohols there can be used, for example: methanol, ethanol, isopropanol and propanol.

As ethers of l- and d-mandelic acid methyl or ethyl ethers are advantageously used.

When reacting a d.l-aminomethyl-(3.4-dihydroxyphenyl)-carbinol with an optically active mandelic acid or an ether thereof diastereoisomeric salts are obtained in a good yield in the form of crystals. They may be purified by recrystallizing them from alcohol. In order to obtain the optically active bases the salts may be decomposed by methods known per se. An optically active base remaining in solution in salt form after fractional crystallization may always be obtained from the mother liquors.

As compared with the known processes the process according to the present invention offers a series of advantages. By the use of anhydrous alcohols as solvents anhydrous salts are obtained which are soluble in hot alcohol and which separate on cooling in the form of crystals. The yield is good. The salts so obtained are purified by recrystallizing them, a once repeated recrystallization of the salts being sufficient to obtain the fraction in a completely pure state, whereas in the known process it is necessary to recrystallize them four or five times whereby the yield of each salt is decreased. When the decomposition of the salts into the optically active bases has been carried out, the optically active mandelic acids or ethers thereof which have been used may be recovered and used again.

The following examples serve to illustrate the invention, but thy are not intended to limit it thereto:

Example 1

8.0 grams of d.l-aminomethyl-(3.4-dihydroxyphenyl)-carbinol are suspended in 30 cc. of absolute ethanol and mixed with a hot solution of 8.5 grams of l-mandelic acid methyl ether in 40 cc. of anhydrous ethanol. By heating the reaction mixture on a steam bath the base enters into solution. On cooling and inoculating the solution, the salt of l-mandelic acid methyl ether with l-aminomethyl-(3.4-dihydroxyphenyl)-carbinol separates out immediately in the form of crystals melting at 180–185° C. The yield is 8.5 grams. By recrystallizing twice from alcohol the pure salt is obtained melting at 193–194° C. The l-base prepared from the resulting salt with aqueous hydrochloric acid has an optical rotation of $[\alpha]_D^{20} = -39.5°$.

Example 2

5.0 grams of d.l-aminomethyl-(3.4-dihydroxyphenyl)-carbinol are suspended in 20 cc. of anhydrous methanol and mixed with a hot solution of 5.2 grams of l-mandelic acid methyl ether in absolute methanol whereby the base dissolves. On cooling, the salt of l-mandelic acid methyl ether with l-aminomethyl-(3.4-dihydroxyphenyl)-carbinol separates out in the form of crystals after a short time. Yield: 3.6 grams. Melting point: 188–190° C. By simple or once repeated crystallization, the pure salt melting at 194° C. is obtained. The l-base prepared from the salt so obtained, in the form of an aqueous hydrochloride solution of 5% strength has an optical rotation of $[\alpha]_D^{20} = -39°$.

Example 3

8.0 grams of d.l-aminomethyl-(3.4-dihydroxyphenyl)-carbinol are suspended in 30 cc. of absolute ethanol and mixed with a hot anhydrous ethanolic solution of 9.0 grams of d-mandelic acid methyl ether and dissolved by further heating the reaction mixture on a steam bath. On cooling the solution so obtained, the salt of d-mandelic acid methyl ether with d-amino-methyl-(3.4-dihydroxyphenyl)-carbinol immediately separates out in the form of crystals. The yield is 8.5 grams. The salt is filtered off with suction, purified by a simple or once repeated recrystallization and dissolved in a small amount of water. From the solution so obtained, d-amino-methyl-(3.4-dihydroxyphenyl)-carbinol is prepared by fractional precipitation with ammonia. The compound so obtained, in the form of an aqueous hydrochloride solution of 5 percent strength, has an optical rotation of $[\alpha]_D^{20} = +39°$. The alcoholic mother liquor is concentrated, the residue is dissolved in a small amount of water and the l-base is prepared therefrom by fractional precipitation with ammonia. The l-base so obtained, in the form of an aqueous hydrochloride solution of 5 percent strength, has an optical rotation of $[\alpha]_D^{20} = -39°$.

Example 4

8.0 grams of d.l-aminomethyl-(3.4-dihydroxyphenyl)-carbinol and 7.5 grams of l-mandelic acid are dissolved in 30 cc. of absolute ethanol. On cooling the solution, the salt of l-mandelic acid with l-aminomethyl-(3.4-dihydroxyphenyl)-carbinol separates out in the form of crystals, which after being recrystallized twice from alcohol, are pure. The l-base prepared from the compound so obtained, with aqueous hydrochloric acid of 5% strength, has an optical rotation of $[\alpha]_D^{20} = -39°$.

Example 5

4 grams of d.l-aminomethyl-(3.4-dihydroxyphenyl)- carbinol and 3.8 grams of *l*-mandelic acid are dissolved by heating them together with 12 cc. of anhydrous n-propyl alcohol. On cooling, the salt of *l*-mandelic acid with *l*-aminomethyl-(3.4-dihydroxyphenyl)-carbinol separates out in the form of crystals and is then worked up as described in Example 4. From the resulting salt the *l*-base is prepared of which the hydrochloride has an optical rotation of $[\alpha]_D^{20} = -39°$.

We claim:

1. The process for separating *l*- and *d*-aminomethyl-(3,4-dihydroxyphenyl)-carbinol from an equimolecular mixture of said bases, which comprises heating said mixture of bases on the steam bath with an acid selected from the group consisting of *l*-mandelic acid and *d*-mandelic acid in an anhydrous lower alkyl alcohol to thereby form salts of said bases with said acid which salts dissolve in said alcohol, and thereafter cooling said solution whereby the acid salt of one of said bases precipitates from said solution while the acid salt of the other base remains in solution.

2. In the process for separating *l*- and *d*-aminomethyl-(3,4-dihydroxyphenyl)-carbinol from an equimolecular mixture of said bases wherein said mixture of bases is reacted with an optically active mandelic acid in a solvent to form a solution of the corresponding salts, said solution is cooled to separate the corresponding acid salts of the *l*- and *d*-aminomethyl-(3,4-dihydroxyphenyl)-carbinol, said acid salts of these individual bases are separately recrystallized and reconverted to the corresponding individual bases, the improvement which comprises effecting the reacting of said mixture of bases with a member selected from the group consisting of *l*-mandelic acid and *d*-mandelic acid in an anhydrous lower alkyl alcohol.

3. The process for separating *l*- and *d*-aminomethyl-(3,4-dihydroxyphenyl)-carbinol from an equimolecular mixture of said bases, which comprises heating said mixture with *l*-mandelic acid in an anhydrous lower alkyl alcohol to thereby form a diastereoisomeric mixture of *l*-mandelic acid salts of *l*- and *d*-aminomethyl-(3,4-dihydroxyphenyl)-carbinol, which salts dissolve in said alcohol, and thereafter cooling said solution whereby the salt of *l*-mandelic acid and *l*-aminomethyl-(3,4-dihydroxyphenyl)-carbinol precipitates from said solution while the salt of *l*-mandelic acid and *d*-aminomethyl-(3,4-dihydroxyphenyl)-carbinol remains in solution.

4. The process for separating *l*- and *d*-aminomethyl-(3,4-dihydroxyphenyl)-carbinol from an equimolecular mixture of said bases, which comprises heating said mixture with *d*-mandelic acid in an anhydrous lower alkyl alcohol to thereby form a diastereoisomeric mixture of the *d*-mandelic acid salts of *l*- and *d*-aminomethyl-(3,4-dihydroxyphenyl)-carbinol, which salts dissolve in said alcohol, and thereafter cooling said solution whereby the salt of *d*-mandelic acid and *d*-aminomethyl-(3,4-dihydroxyphenyl)-carbinol precipitates from said solution while the salt of *d*-mandelic acid and *l*-aminomethyl-(3,4-dihydroxyphenyl)-carbinol remains in solution.

5. The salt of a base selected from the group consisting of *l*-aminomethyl-(3,4-dihydroxyphenyl)-carbinol and *d*-aminomethyl-(3,4-dihydroxyphenyl)-carbinol with an acid selected from the group consisting of *l*-mandelic acid and *d*-mandelic acid.

6. The salt of *l*-mandelic acid with *l*-aminomethyl-(3,4-dihydroxyphenyl)-carbinol.

7. The salt of *l*-mandelic acid methyl ether with *l*-aminomethyl-(3,4-dihydroxyphenyl)-carbinol.

8. The salt of *d*-mandelic acid with *d*-aminomethyl-(3,4-dihydroxyphenyl)-carbinol.

9. The salt of *d*-mandelic acid methyl ether with *d*-aminomethyl-(3,4-dihydroxyphenyl)-carbinol.

10. The salt of *l*-mandelic acid methyl ether with *d*-aminomethyl-(3,4-dihydroxyphenyl)-carbinol.

References Cited in the file of this patent

UNITED STATES PATENTS

| 1,867,274 | Manske | July 12, 1932 |
| 2,229,187 | Peyer | Jan. 21, 1941 |
| 2,243,977 | Peyer | June 3, 1941 |

FOREIGN PATENTS

| 639,126 | Germany | Nov. 28, 1936 |
| 656,500 | Great Britain | Aug. 22, 1951 |

OTHER REFERENCES

Fullar: "Jour. Am. Chem. Soc." (June 1948), vol. 70, pp. 2067–8.